United States Patent
Choi

(10) Patent No.: US 8,909,843 B1
(45) Date of Patent: Dec. 9, 2014

(54) PERIPHERAL COMPONENT INTERCONNECT EXPRESS SWITCH APPARATUS AND METHOD OF CONTROLLING CONNECTION THEREOF

(71) Applicant: Electronics and Telecommunications Research Institute, Daejeon (KR)

(72) Inventor: Yongseok Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/037,147

(22) Filed: Sep. 25, 2013

(30) Foreign Application Priority Data

Jul. 15, 2013 (KR) .......................... 10-2013-0083093

(51) Int. Cl.
G06F 13/38 (2006.01)
G06F 11/20 (2006.01)
G06F 13/40 (2006.01)
G06F 13/00 (2006.01)

(52) U.S. Cl.
CPC .......... *G06F 11/2002* (2013.01); *G06F 13/385* (2013.01); *G06F 13/4022* (2013.01)
USPC ........... 710/314; 710/2; 710/5; 710/8; 710/11

(58) Field of Classification Search
None
See application file for complete search history.

(56) References Cited

U.S. PATENT DOCUMENTS

2012/0144230 A1 6/2012 Buckland et al.
2013/0346665 A1* 12/2013 Freking et al. ................ 710/313

* cited by examiner

*Primary Examiner* — Scott Sun
(74) *Attorney, Agent, or Firm* — Kile Park Reed & Houtteman PLLC

(57) ABSTRACT

A peripheral component interconnect (PCI) express switch apparatus and a method of controlling a connection thereof are provided. In this apparatus, a first virtual bridge is connected to a computer system through a first PCI express port to perform data transmission and reception according to a PCI method with an external device, and a second virtual bridge is connected to an external device through the first virtual bridge and a second PCI express port and enables the external device to perform data transmission and reception with the computer system and according to the PCI method by cooperating with the first virtual bridge. A first cable matching device is connected to the first virtual bridge. Further, a second cable matching device is connected to the second virtual bridge and is connected to the first cable matching device through a PCI cable. In addition, the PCI cable has a cable corresponding to lanes of the number of more than that of a maximum lane in which the first virtual bridge and the second virtual bridge perform data transmission and reception.

17 Claims, 8 Drawing Sheets

PERIPHERAL COMPONENT INTERCONNECT EXPRESS SWITCH APPARATUS AND METHOD OF CONTROLLING CONNECTION THEREOF

CROSS-REFERENCE TO RELATED APPLICATION

This application claims priority to and the benefit of Korean Patent Application No. 10-2013-0083093 filed in the Korean Intellectual Property Office on Jul. 15, 2013, the entire contents of which are incorporated herein by reference.

BACKGROUND OF THE INVENTION (a) Field of the Invention

The present invention relates to a peripheral component interconnect express (hereinafter referred to as a "PCI express" or "PCIe") switch apparatus and a method of controlling a connection thereof.

(b) Description of the Related Art

PCI express technology is technology for interfacing input/output (I/O) between a central processing unit (CPU) and a peripheral device within a computer system. Such PCI express technology was initially applied to an interface using a chip-to-chip or a slot, but currently, in order to extend a PCI express interface to the outside, a method of extending the PCI express interface to the outside using a PCI express cable or other copper and optic cable has been introduced. Thereby, the PCI express interface can be used as an extension interface to the outside as well as the inside of a computer system. Particularly, a method of transmitting a PCI express signal together with a video signal using a new copper cable such as a thunderbolt cable has been introduced.

In the conventional art that transmits a PCI express signal to a cable, a signal that is defined as a PCI express specification using a PCI express switch is generally used. However, in view of a characteristic of a method of controlling a connection to a multiple lane of PCI express, when using a cable having several paths so as to transmit and receive a signal using a multiple cable or to transmit and receive a multiple signal, if a problem occurs in one of a multiple signal transmitting/receiving path on each lane basis, a transmitting/receiving speed may rapidly decrease, or it may be impossible to transmit and receive. Particularly, when a transmitting path is short, if a problem occurs, by replacing a cable or a device that causes the problem, the problem can be solved, but when a transmitting path is a long distance such as 100 m-10 km, if a problem occurs, a device can be replaced, but there is much difficulty in replacing a cable and thus a case of inevitably stopping a service may occur.

However, in a method of using an existing PCI express switch, a method of transmitting and receiving a PCI express signal in a cable is selected, and thus when a failure occurs in some transmitting path, there is no countermeasure for the failure and a solution is thus requested.

SUMMARY OF THE INVENTION

The present invention has been made in an effort to provide a PCI express switch apparatus and a method of controlling a connection thereof having advantages of providing a continuous service even in a case in which a problem occurs in a portion of a multiple signal extension cable when extending a PCI express multiple signal to the outside while satisfying a PCI express specification for a PCI express mutual operation.

An exemplary embodiment of the present invention provides a PCI express switch apparatus, the PCI express switch apparatus including: a first virtual bridge that is connected to a computer system through a first PCI express port to perform data transmission and reception according to a PCI method with an external device; a second virtual bridge that is connected to the external device through a second PCI express port and that enables the external device to perform data transmission and reception with the computer system according to the PCI method by cooperating with the first virtual bridge; a first cable matching device that is connected to the first virtual bridge; and a second cable matching device that is connected to the second virtual bridge and that is connected to the first cable matching device through a PCI cable, wherein the PCI cable has a cable corresponding to lanes of a number of more than that of a maximum lane in which the first virtual bridge and the second virtual bridge perform data transmission and reception.

The first virtual bridge may transmit a training sequence to the second virtual bridge and determine a maximum N number of lanes among an N+n number of cables, when the number of the maximum lane is N (where N is a natural number of 1 or more), and the number of cables which the PCI cable has is N+n (where n is a natural number, which is a maximum N).

The first virtual bridge and the second virtual bridge may be formed in a PCI express hierarchical structure.

The first virtual bridge may include: a first upstream lane physical layer unit that is connected to the first PCI express port so as to physically transmit a packet to the computer system; a first downstream lane physical layer unit that is connected to the first cable matching device so as to physically transmit a packet to the external device; a first transaction layer that performs assembling and disassembling of a packet that is transmitted and received through the upstream lane physical layer unit and the downstream lane physical layer unit; a first data link layer unit that operates as a data transport component between the transaction layer unit and the upstream lane physical layer unit and that provides a link to a reliable mechanism for exchanging a packet between the transaction layer unit and the upstream lane physical layer unit; and a first cable transmitting data link layer unit that operates as a data transport component between the transaction layer unit and the downstream lane physical layer unit and that provides a link to a reliable mechanism for exchanging a packet between the transaction layer unit and the downstream lane physical layer unit.

The second virtual bridge may include: a second downstream lane physical layer unit that is connected to the second PCI express port so as to physically transmit a packet to the external device; a second upstream lane physical layer unit that is connected to the second cable matching device so as to physically transmit a packet to the computer system; a second transaction layer that performs assembling and disassembling of a packet that is transmitted and received through the downstream lane physical layer unit and the upstream lane physical layer unit; a second data link layer unit that operates as a data transport component between the second transaction layer unit and the second upstream lane physical layer unit and that provides a link to a reliable mechanism for exchanging a packet between the second transaction layer unit and the second upstream lane physical layer unit; and a second cable transmitting data link layer unit that operates as a data transport component between the second transaction layer unit and the second downstream lane physical layer unit and that provides a link to a reliable mechanism for exchanging a packet between the second transaction layer unit and the second downstream lane physical layer unit.

The first virtual bridge and the second virtual bridge each may determine a transmittable lane by transmitting a mutual training sequence through the N+n number of PCI cables.

The first virtual bridge and the second virtual bridge may form the N number of lanes by replacing a lane in which a failure has occurred with available lanes among the additional n number of lanes, when the lane in which a failure has occurred exists among the N number of lanes.

The first downstream lane physical layer unit and the second upstream lane physical layer unit each may have a link training sequence state machine (LTSSM) on a lane basis corresponding to the N+n number of cables, and may include a bus that is commonly connected to the LTSSM on a lane basis in order for the LTSSM on a lane basis to share a status transition and a status of a training sequence that is received by the LTSSM on a lane basis.

Another embodiment of the present invention provides a method in which a PCI express switch apparatus that connects a computer system and an external device by a PCI express method controls a connection to an external device, wherein the PCI express switch apparatus connects the external device to the computer system through a PCI cable, and the PCI cable has a cable corresponding to lanes of a number more than that of a maximum lane that transmits and receives data to and from the external device, and the PCI express switch apparatus includes a first virtual bridge that is connected to the computer system and a second virtual bridge that is connected to the external device, the method including: determining, by the first virtual bridge and the second virtual bridge, a lane in which a failure occurs by transmitting a training sequence to each other; determining, when a lane in which a failure occurs is determined, a link width with remaining lanes, except for the lane in which a failure occurs; and controlling data transmission according to a PCI express method with the computer system and the external device through the determined link width.

The determining of a lane in which a failure occurs may include determining, by the first virtual bridge and the second virtual bridge, a lane in which a failure occurs by transmitting a training sequence through the N+n number of cables, when the number of the maximum lane is N (where N is a natural number of 1 or more), and the number of cables which the PCI cable has is N+n (where n is a natural number, which is a maximum N).

The determining of a lane in which a failure occurs may include: transmitting, by a downstream lane that is formed by the first virtual bridge, TS1 having a predetermined link value and a lane value of a PAD to an upstream lane that is formed by the second virtual bridge through the N+n number of lanes; transmitting, by the upstream lane, TS1 having a lane value and a link value of the PAD to the downstream lane through the N+n number of lanes; transmitting, by the upstream lane, TS1 having a lane value of a PAD and a link value that is received from the downstream lane to a lane that receives TS1, and transmitting TS1 having a link value and a lane value that are set to the PAD to a lane that is determined as a lane in which a failure occurs by not receiving TS1, at the transmitting of TS1; and determining, by the downstream lane, a lane in which a failure occurs by not receiving TS1, at the transmitting of TS1.

The determining of a link width may include: transmitting, by the downstream lane, TS1 having a series of lane values, except for a lane in which a failure occurs among the N+n number of lanes; transmitting, by the upstream lane, TS1 having a series of lane values, except for a lane in which a failure occurs among the N+n number of lanes; determining, by the downstream lane, an available lane in the downstream lane based on a lane value that is transmitted from the upstream lane; and determining, by the upstream lane, an available lane in the upstream lane based on a lane value that is transmitted from the downstream lane.

The controlling of data transmission may include: transmitting, by the downstream lane, TS1 having a series of lane values to a lane available in the downstream lane; transmitting, by the upstream lane, TS1 having a series of lane values to a lane available in the upstream lane; transmitting, by the downstream lane, TS2 having a predetermined lane value, when the downstream lane receives TS1 having a lane value corresponding with a value in which the downstream lane transmits from the upstream lane; and controlling, by the downstream lane and the upstream lane, data transmission between the computer system and the external device through a lane having a predetermined lane value through TS2.

The downstream lane and the upstream lane each may include an LTSSM on a lane basis, the LTSSM may include a Configuration.Linkwidth.Start status, a Configuration.Linkwidth.Accept status, a Configuration.Lanenum.Wait status, a Configuration.Lanenum.Accept status, and a Configuration.Complete status, and a status transition may occur by TS1 that is received between the downstream lane and the upstream lane.

The downstream lane and the upstream lane may determine a lane in which a failure occurs through a transition of the Configuration.Linkwidth.Start status and the Configuration.Linkwidth.Accept status.

The downstream lane and the upstream lane may determine a lane corresponding to a link width through a transition of the Configuration.Lanenum.Wait status and the Configuration.Lanenum.Accept status.

The downstream lane may include lane information corresponding to the link width in TS2 in the Configuration.Complete status, transmit the TS2 to the upstream lane, and complete a link width negotiation between the downstream lane and the upstream lane.

According to the present invention, even if a lane is added, a link width can be determined using the entire number of available lanes regardless of the order of the lane, and thus even if a problem occurs in a random portion like a cable, bandwidth can be guaranteed using the lane to the maximum.

DETAILED DESCRIPTION OF THE EMBODIMENTS

Figure 1:
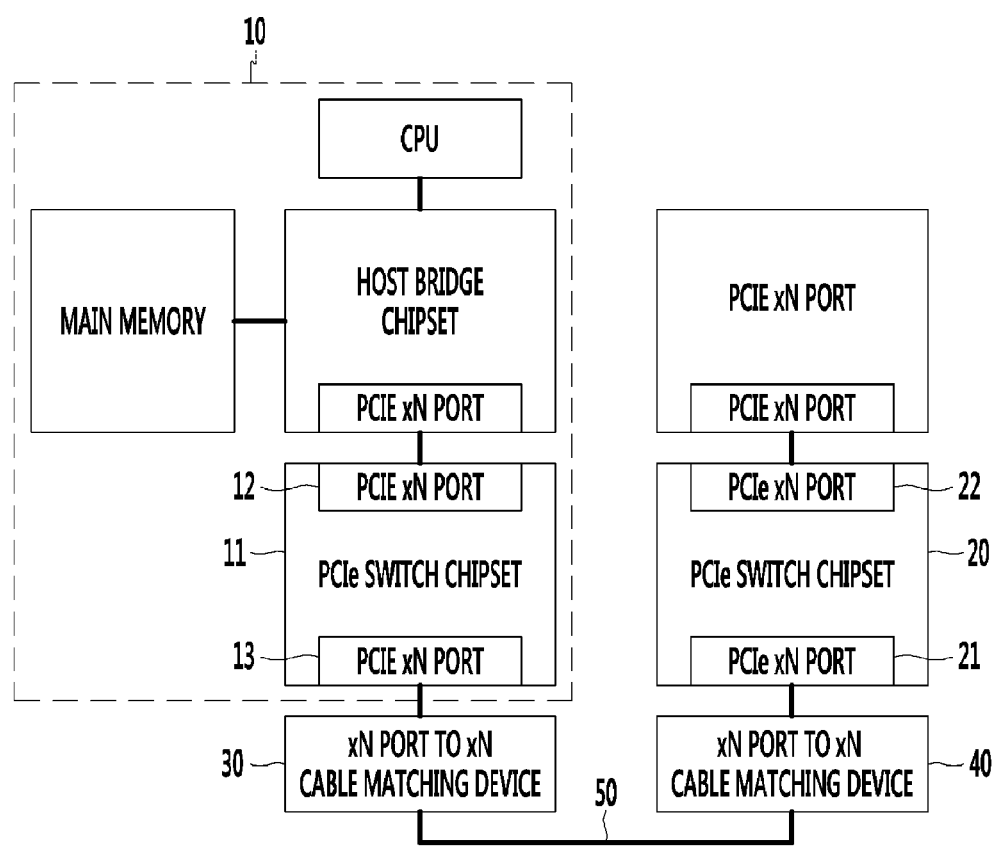
FIG. 1 is a diagram illustrating a structure according to a general method of extending a cable using a PCI express switch chipset.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Hereinafter, a method of extending a cable using a PCI express switch chipset will be described with reference to FIG. 1.

FIG. 1 is a diagram illustrating a structure according to a general method of extending a cable using a PCI express switch chipset.

Referring to FIG. 1, in order to extend a PCI express signal to the outside, at the inside and outside of a computer system 10, PCI express switch chipsets 11 and 20, respectively, are used, and the PCI express switch chipset 11 and the PCI express switch chipset 20 are connected to an xN cable 50 using xN port to xN cable matching devices 30 and 40. Here, N is the number of lanes of a PCI express interface, and may have a value of 1, 2, 4, 8, 12, 16, and 32.

Because PCI express xN ports 12, 13, 21, and 22 existing at the PCI express switch chipsets 11 and 20 should have compatibility with a PCI express specification, a first lane or a final lane should necessarily operate, and a normally operating lane should have continuity.

For example, when x8 lanes having a total of 8 lanes are a first lane, a second lane, a third lane, a fourth lane, a fifth lane, a sixth lane, a seventh lane, and an eighth lane, for an x8 operation, the entire first-eighth lanes should operate, and for an x4 operation, the entire first-fourth lanes should operate or the entire fifth-eighth lanes should operate. Further, for an x2 operation, the entire first-second lanes should operate or the entire seventh-eighth lanes should operate. If the second lane cannot be operated, operation of x4 can be performed using fifth-eight lanes, which are lanes that can be operated, and if the seventh lane cannot be operated, operation of x4 can be performed using the first-fourth lanes, which are lanes that can be operated. Alternatively, if the third lane or the sixth lane cannot be operated, operation of x2 can be performed using the first-second lanes or the seventh-eighth lanes. In a worse case, if the second lane and the seventh lane do not operate, operating lanes total 6 lanes of the first, third, fourth, fifth, sixth, and eighth lanes, but because all of the first-second lanes and the seventh-eighth lanes do not operate, operation of x2 is impossible and thus only operation of x1 that uses only the first lane or the eighth lane is available.

Because conventional PCI express switch chipsets 11 and 20 were not made in consideration of cable extension, when wishing to extend a cable using the PCI express switch chipsets 11 and 20, the above restriction condition should be maintained for compatibility and cannot be changed.

Figure 2:
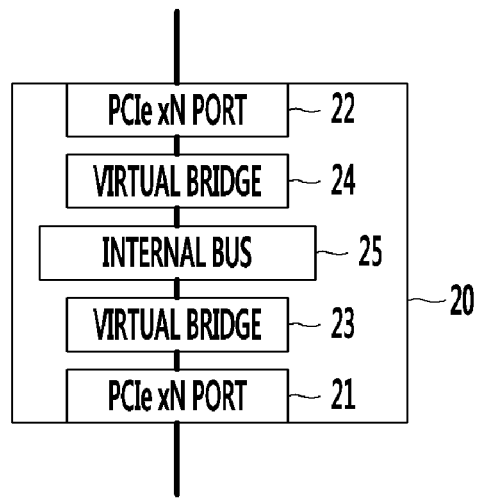
FIG. 2 is a diagram illustrating an internal configuration of the PCI express switch chipset of FIG. 1.

FIG. 2 is a diagram illustrating an internal configuration of the PCI express switch chipsets 11 and 20 of FIG. 1. Here, the PCI express switch chipsets 11 and 20 have the same structure and thus only one PCI express switch chipset 20 will be described.

Referring to FIG. 2, the PCI express switch chipset 20 includes two PCI express xN ports 21 and 22, two virtual bridges 23 and 24, and an internal bus 25.

The internal bus 25 that connects the virtual bridge 23 and the virtual bridge 24 is not defined in a PCI express specification, and an embodiment method may be randomly determined by an embodying person.

Therefore, in an exemplary embodiment of the present invention, a cable is extended using such an internal bus 25.

Figure 3:
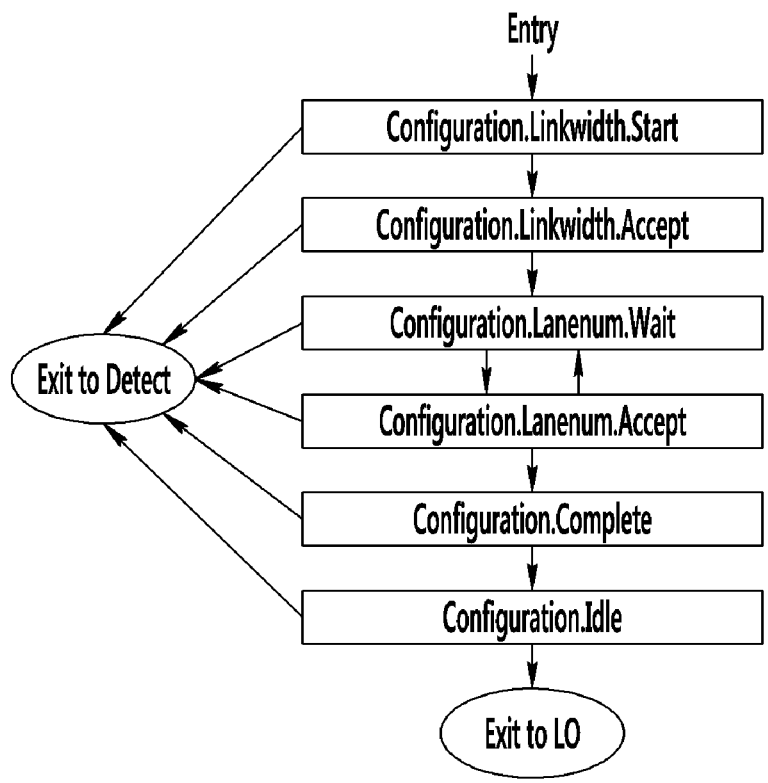
FIG. 3 is a diagram illustrating operation of a general LTSSM.

FIG. 3 is a diagram illustrating operation of a general link training sequence state machine (hereinafter referred to as an "LTSSM").

The LTSSM includes a detection status, a polling status, a configuration status, an L0 status, and a restoration status, but in an LTSSM that initially sets and manages a status of a link in a PCI express specification, FIG. 3 represents a configuration status representing a step of setting a lane and represents an advancing method to an L0 status in which a link normally operates.

A condition in which an actual status transition occurs is different according to whether a lane is an upstream lane or a downstream lane, and this is because a subject of link setting is a downstream lane.

Figure 4:
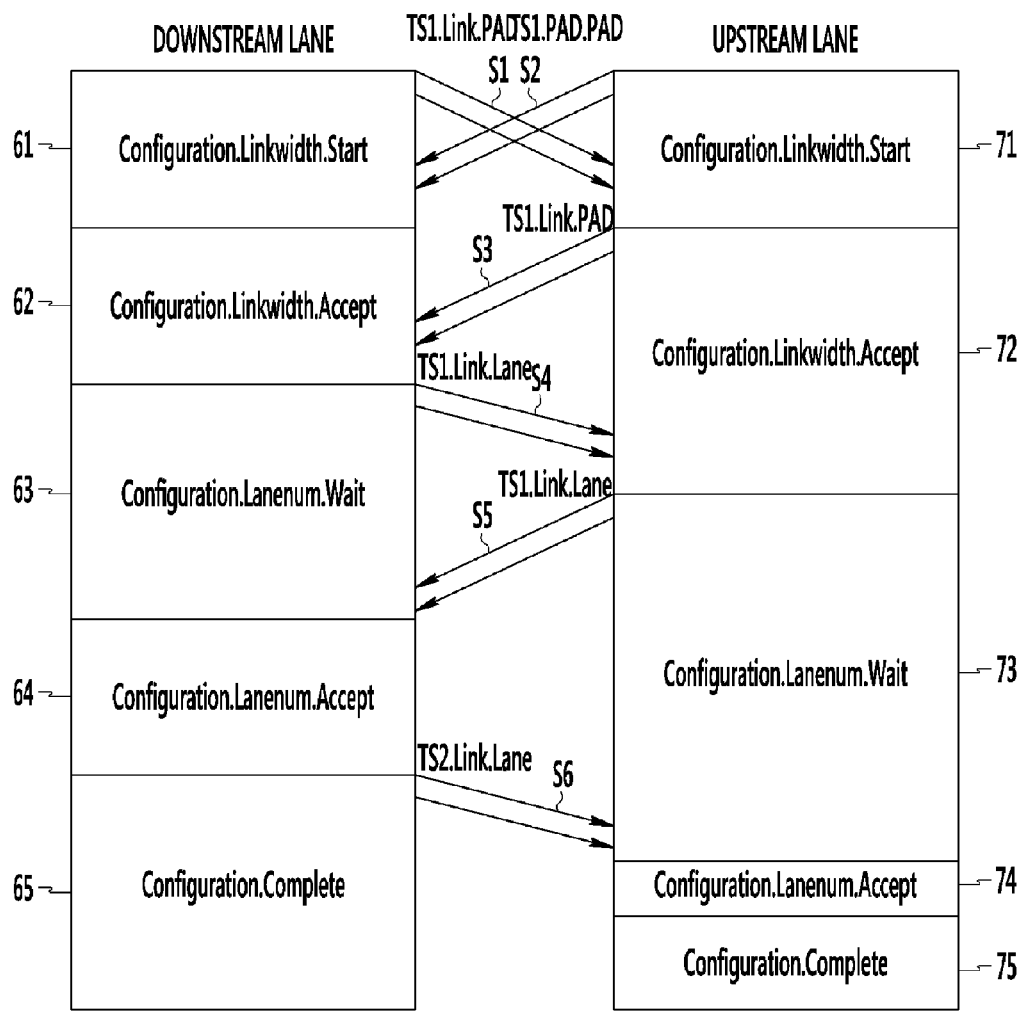
FIG. 4 is a diagram illustrating a configuration status transition when an order of an upstream lane and an order of downstream lane are the same in a general PCI express LTSSM.

In a PCI express link example having a lane width of x8, when the order of a lane that is set in an upstream lane corresponds with the order of a lane that is set in a downstream lane, a status transition order for link setting that is defined in a PCI express specification is shown in FIG. 4.

FIG. 4 is a diagram illustrating a configuration status transition when the order of an upstream lane and the order of a downstream lane are the same in a general PCI express LTSSM.

Referring to FIG. 4, a downstream lane of a Configuration.Linkwidth.Start status 61 transmits a training sequence (hereinafter referred to as "TS") (TS1) having a predetermined link value and a lane value of a pad to an entire lane that senses a receiver (S1).

The upstream lane transmits TS1 having a link value and a lane value that are set to a PAD to the entire lane that senses a receiver (S2).

A status of the downstream lane, having received two continuous TS1 having a link value of the PAD in any lane is changed to a Configuration Linkwidth.Accept status 62.

An upstream lane of a Configuration.Linkwidth.Start status 71 continuously receives two TS1 having a predetermined link number and a lane number of the PAD in any lane, and a status of the upstream lane is changed to a Configuration Linkwidth.Accept status 72.

Thereafter, the upstream lane transmits the TS1 having the received link value and a lane value of the PAD to a lane that receives the TS1 and transmits TS1 having a link value and a lane value of the PAD to a lane that does not receive the TS1 (S3).

A downstream lane of the Configuration.Linkwidth.Accept status 62 receives TS1 having a link value in which the downstream lane transmits and a lane value of the PAD in any lane, and a status of the downstream lane is changed to a Configuration.Lanenum.Wait status 63.

Thereafter, when TS1 having a previous link value and a desired lane value is not received in a second lane, the downstream lane transmits TSI only to a first lane (S4). However, in a third or fourth lane, when the TSI is not received, if x2 setting is available, the TSI is transmitted to the first and second lanes, otherwise, the TSI is transmitted only to the first lane (S4). Further, when the TS1 is not received in fifth to eighth lanes, if x4 setting is available, the TS1 is transmitted to first to fourth lanes, and if x2 setting is available, the TS1 is transmitted to the first lane and the second lane, while if only x1 setting is available, TS1 is transmitted only to the first lane (S4).

However, when the TS1 is received in an entire lane, the TS1 is transmitted to the entire lane, and in the first lane, when the TS1 is not received, operation is stopped. In this case, a lane value starts from 0 and has a continuous value, and TS1 having a link value and a lane value of the PAD is transmitted to the remaining lanes (S4).

After an upstream lane of the Configuration.Linkwidth.Accept status 72 receives two continuous TS1 having a predetermined link value and a lane value, not the PAD in any lane, a status of the upstream lane is changed to a Configuration.Lanenum.Wait status 73.

Thereafter, when the upstream lane does not receive TS1 having the same link value and lane value as those of the received TS1 in the second lane, the upstream lane transmits TS1 only to the first lane (S5). However, in a third or fourth lane, when the TS1 is not received, if x2 setting is available, the TS1 is transmitted to the first and second lanes, otherwise, the TS1 is transmitted only to the first lane (S5). Further, in fifth to eighth lanes, when the TS1 is not received, if x4 setting is available, the TS1 is transmitted to the first to fourth lanes, and if x2 setting is available, the TS1 is transmitted to the first lane and the second lane, while if only x1 setting is available, the TS1 is transmitted only to the first lane (S5). However, when the TS1 is not received in an entire lane, the TS1 is transmitted to an entire lane, and when the TS1 is not received in the first lane, operation is stopped. In this case, a lane value starts from 0 and has a continuous value, and TS1 having a link value and a lane value of the PAD is transmitted to the remaining lanes (S5).

When a downstream lane of the Configuration.Lanenum.Wait status 63 continuously receives two TS1 having a lane value that does not correspond with a lane value when first entering the Configuration.Lanenum.Wait status 63 in any lane, when at least one of link values of a lane does not correspond, or when the downstream lane receives TS1 having a link value and a lane value that correspond with those of TS1 in which the downstream lane transmits, a status of the downstream lane is changed to a Configuration.Lanenum.Accept status 64.

Because the downstream lane continuously receives two TS1 having a link value and a lane value that correspond with those of TS1 in which the downstream lane transmits in a lane of a predetermined width, a status of the downstream lane is changed to a Configuration.Complete status 65, and the downstream lane transmits TS2 in which a link value and a lane value are set (S6).

After an upstream lane of the Configuration.Lanenum.Wait status 73 continuously receives two TS2 in a lane of a predetermined width, a status of the upstream lane is changed to a Configuration.Lanenum.Accept status 74, and because two TS2 are continuously received in a lane of a predetermined width, the upstream lane enters a Configuration.Complete status 75.

In the above method, a total of 8 lanes exist, but when a failure occurs at a second lane, 7 lanes are available, but a lane width may be set to only one lane width. Further, when a failure occurs at a third or fourth lane, 6-7 lanes are available, but there is a problem that a lane width may only be set to a maximum two lane width.

When the upstream lane and the downstream lane are arranged in reverse order, both or either of the upstream lane and the downstream lane should be able to process lanes of a reverse order. In a width of X8, for example, one of two first and final lanes should necessarily be able to operate, and when a failure occurs in a second lane and a second lane from a final lane, only operation of x1 is available. Further, there is a problem that when a failure occurs in a third lane or a fourth lane or a third lane or a fourth lane from a final lane, only operation of x2 is available, and when a failure occurs in a fifth lane to an eighth lane or a fifth lane to an eighth lane from a final lane, only operation of x4 is available.

Hereinafter, a PCI express switch apparatus according to an exemplary embodiment of the present invention for solving the above problem will be described.

Figure 5:
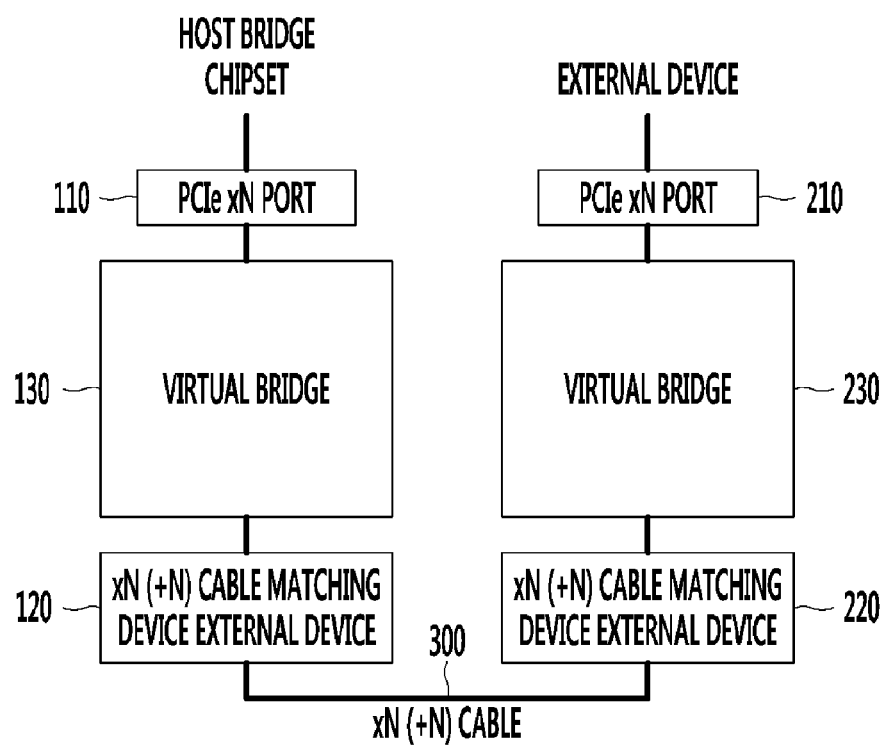
FIG. 5 is a diagram illustrating a configuration of a PCI express switch apparatus according to an exemplary embodiment of the present invention.

FIG. 5 is a diagram illustrating a configuration of a PCI express switch apparatus according to an exemplary embodiment of the present invention.

As shown in FIG. 5, a PCI express switch apparatus according to an exemplary embodiment of the present invention includes PCI express (PCIe) xN ports 110 and 210, xN(+n) cable matching devices 120 and 220, and virtual bridges 130 and 230. Here, it is preferable that the PCI express xN port 110 and the virtual bridge 130 are positioned within the computer system 10.

The PCI express xN port 110 is connected to a host bridge chipset (not shown) that controls the computer system 10, as shown in FIG. 1.

The PCI express xN port 210 is connected to an external PCI express device (not shown) that is connected to the computer system 10 through a PCI express method.

The XN(+n) cable matching device 120 is connected to the virtual bridge 130, and is connected to the xN(+n) cable matching device 220 of the external device side through an xN(+n) cable 300. In this case, the xN(+n) cable 300 is formed with the total N+n number of cables, and when the computer system 10 and the external device can transmit data according to a PCI express method using the maximum N number (where N has a value of 1, 2, 4, 8, 12, 16, and 32) of lanes, in addition to the N number of cables, the n number of cables are further provided. Here, a maximum value of n is N. That is, the xN(+n) cable 300 may be formed with the minimum N+1 number of cables to the maximum 2N number of cables. Here, when a failure occurs in the N number of lanes that are formed with the basic N number of cables, additional n number of cables are cables that can transmit and receive data instead of a cable in which a failure has occurred.

Therefore, the xN(+n) cable matching device 120 transports data between the virtual bridge 130 and the xN(+n) cable matching device 220 through the xN(+n) cable 300 that is formed with the N+n number of cables.

The virtual bridge 130 is connected to a host bridge chipset through the PCI express xN port 110 and is connected to the xN(+n) cable matching device 220 of the external device side through the xN(+n) cable matching device 120 to perform data transmission and reception according to a PCI express method between the host bridge chipset and the external device. In this case, the virtual bridge 130 performs data transmission and reception through the maximum N number of lanes, selects the maximum N number of cables that are used for data transmission and reception in the N+n number of cables of the xN(+n) cable 300 that is connected between the xN(+n) cable matching devices 120 and 220, and uses the maximum N number of cables for data transmission and reception. That is, when a cable having a failure exists within the N number of cables, the virtual bridge 130 may form the maximum N number of lanes using a cable having no failure in the additional n number of cables. For this purpose, the virtual bridge 130 determines a cable in which a failure has occurred by transmitting and receiving TS data through the N+n number of cables and forms a lane for data transmission and reception using cables, except for the cable in which a failure has occurred, among the N+n number of cables. In this case, the number of the formed lanes becomes the maximum N number.

In this way, by embodying a cable extension that is additionally formed with the n number of cables in addition to the n number of cables, the virtual bridge 130 according to an exemplary embodiment of the present invention can continuously operate even in a case in which a failure occurs in a lane without deviating from a PCI express specification.

For example, in a worst case, even if a failure occurs in the N number of entire cables, data transmission and reception can be performed using the additional n (where it is assumed that n is N) number of cables.

The xN(+n) cable matching device 220 is connected to the virtual bridge 230, and is connected to the xN(+n) cable matching device 120 of the computer system 100 side through the xN(+n) cable 300. Such an xN(+n) cable matching device 220 has the same configuration and function as the XN(+n) cable matching device 120.

The virtual bridge 230 is connected to an external device through the PCI express xN port 210 and is connected to the xN(+n) cable matching device 120 of the computer system 100 side through the xN(+n) cable matching device 220 to perform data transmission and reception according to a PCI express method between the external device and the host bridge chipset. The virtual bridge 230 has the same configuration and function as the virtual bridge 130. That is, the virtual bridge 230 determines a cable in which a failure has occurred in the virtual bridge 130 by performing TS data transmission and reception with the virtual bridge 130 through the N+n number of cables, receives information of effective cables, except for the cable in which a failures has occurred among the N+n number of cables from the virtual bridge 130, and performs data transmission and reception through lanes that are formed with the effective cables. In this case, the number of the formed lanes becomes the maximum N number.

Figure 6:
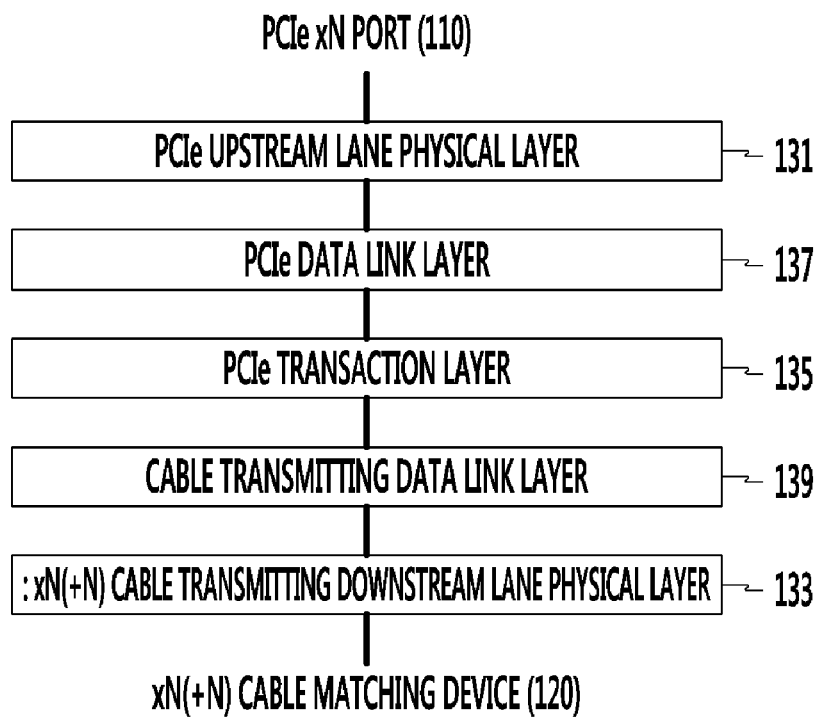
FIG. 6 is a diagram illustrating a detailed configuration of a virtual bridge of FIG. 5.

FIG. 6 is a diagram illustrating a detailed configuration of the virtual bridge 130 of FIG. 5.

As shown in FIG. 6, the virtual bridge 130 includes a PCI express upstream lane physical layer (hereinafter referred to as a "upstream lane physical layer") 131, an xN(+n) cable transmitting downstream lane physical layer (hereinafter referred to as "downstream lane physical layer") 133, a PCI express transaction layer (hereinafter referred to as a "transaction layer") 135, a PCI express data link layer (hereinafter referred to as a "data link layer") 137, and a cable transmitting data link layer 139.

In order to physically transmit a packet to a host bridge chipset within the computer system 10, the upstream lane physical layer 131 is connected to the PCI express xN port 110.

In order to physically transmit a packet to an external device, the downstream lane physical layer 133 is connected to the xN(+n) cable matching device 120.

The transaction layer 135 performs assembling and disassembling of a packet, i.e., a transaction layer packet that is transmitted and received through the upstream lane physical layer 131 and the downstream lane physical layer 133. Such a transaction layer 135 is already well known and therefore a detailed description thereof will be omitted.

The data link layer 137 operates as an intermediate step between the transaction layer 135 and the upstream lane physical layer 131, and provides a link to a reliable mechanism for exchanging a packet between two layers 131 and 135.

The cable transmitting data link layer 139 operates as an intermediate step between the transaction layer 135 and the downstream lane physical layer 133, and provides a link to a reliable mechanism for exchanging a packet between two layers 133 and 135.

Figure 7:
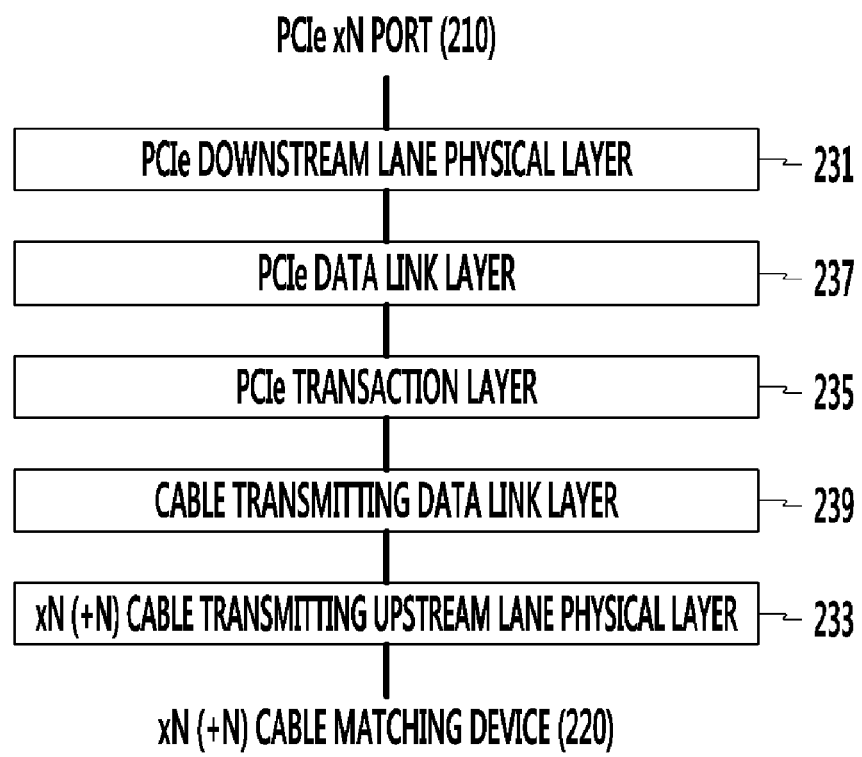
FIG. 7 is a diagram illustrating a detailed configuration of a virtual bridge of FIG. 6.

FIG. 7 is a diagram illustrating a detailed configuration of the virtual bridge 230 of FIG. 6.

As shown in FIG. 7, the virtual bridge 230 includes a PCI express downstream lane physical layer (hereinafter referred to as a "downstream lane physical layer") 231, an xN(+n) cable transmitting upstream lane physical layer (hereinafter referred to as an "upstream lane physical layer") 233, a PCI express transaction layer (hereinafter referred to as a "transaction layer") 235, a PCI express data link layer (hereinafter referred to as a "data link layer") 237, and a cable transmitting data link layer 239.

In order to physically transmit a packet to an external device, the downstream lane physical layer 231 is connected to the PCI express xN port 210.

In order to physically transmit a packet to the computer system 10, the upstream lane physical layer 233 is connected to the xN(+n) cable matching device 220.

The transaction layer 235 performs assembling and disassembling of a packet, i.e., a transaction layer packet that is transmitted and received through the downstream lane physical layer 231 and the upstream lane physical layer 233. Such a transaction layer 235 is already well known and therefore a detailed description thereof will be omitted.

The data link layer 237 operates as an intermediate step between the transaction layer 235 and the downstream lane physical layer 231, and provides a link to a reliable mechanism for exchanging a packet between two layers 231 and 235.

The cable transmitting data link layer 239 operates as an intermediate step between the transaction layer 235 and the upstream lane physical layer 233, and provides a link to a reliable mechanism for exchanging a packet between two layers 233 and 235.

By transmitting and receiving TS data through the N+n number of cables of the xN(n) cable 300, the downstream lane physical layer 133 of the virtual bridge 130 and the upstream lane physical layer 233 of the virtual bridge 230 determine a cable in which a failure has occurred, and form the maximum N number of lanes for data transmission and reception using cables, except for the cable in which a failure has occurred, among the N+n number of cables.

Figure 8:
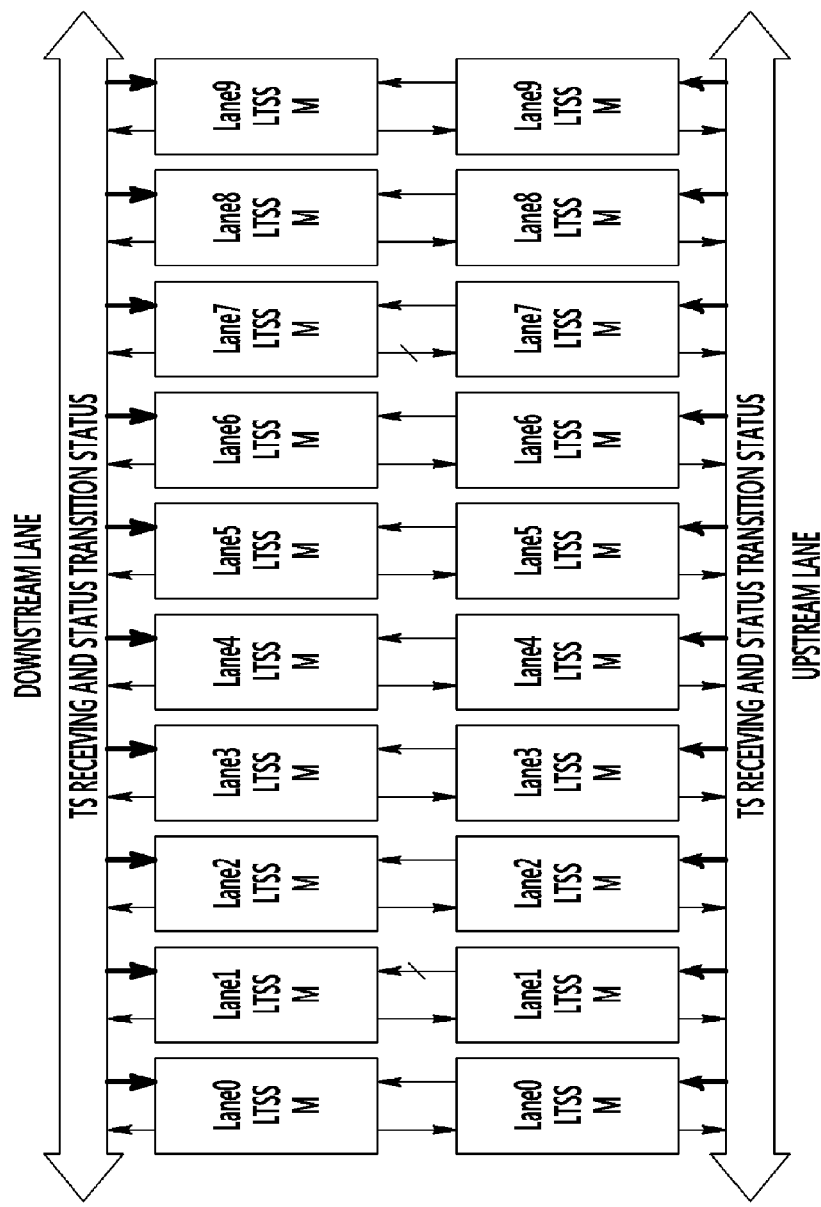
FIG. 8 is a diagram illustrating an example in which an x8 lane is applied in a PCI express switch apparatus according to an exemplary embodiment of the present invention.

FIG. 8 is a diagram illustrating an example in which an x8 lane is applied in a PCI express switch apparatus according to an exemplary embodiment of the present invention.

FIG. 8 illustrates a form in which an x8 lane is applied in a PCI express switch apparatus according to an exemplary embodiment of the present invention and in which two extra cable interfaces are added in n=2. Further, FIG. 8 illustrates a case in which a failure occurs in a lane 1 and a lane 7.

In FIG. 8, an LTSSM exists on a lane basis. This is because a packet that is transmitted and received in a PCI express architecture physical layer is defined on a lane basis, and a link width is determined on a lane basis. Therefore, until a link width is determined, by enabling an LTSSM to operate on a lane basis, when a failure occurs in the lane, the LTSSM is isolated, and a link width can be determined with only the remaining lanes.

There is a case in which a status transition of the LTSSM should be simultaneously performed based on a status of an entire lane, and for this purpose, whether a reception status and status transition of TS occur on a lane basis is output to an external bus, and by inputting all of bus contents to each lane, synchronization is performed on a lane basis.

FIG. 8 illustrates a case in which, for example, in a downstream lane of a PCI express link having a lane width of x8, a failure occurs in reception in a second lane (lane 1), and in a upstream lane thereof, a failure occurs in reception in a final lane (lane 7).

Figure 9:
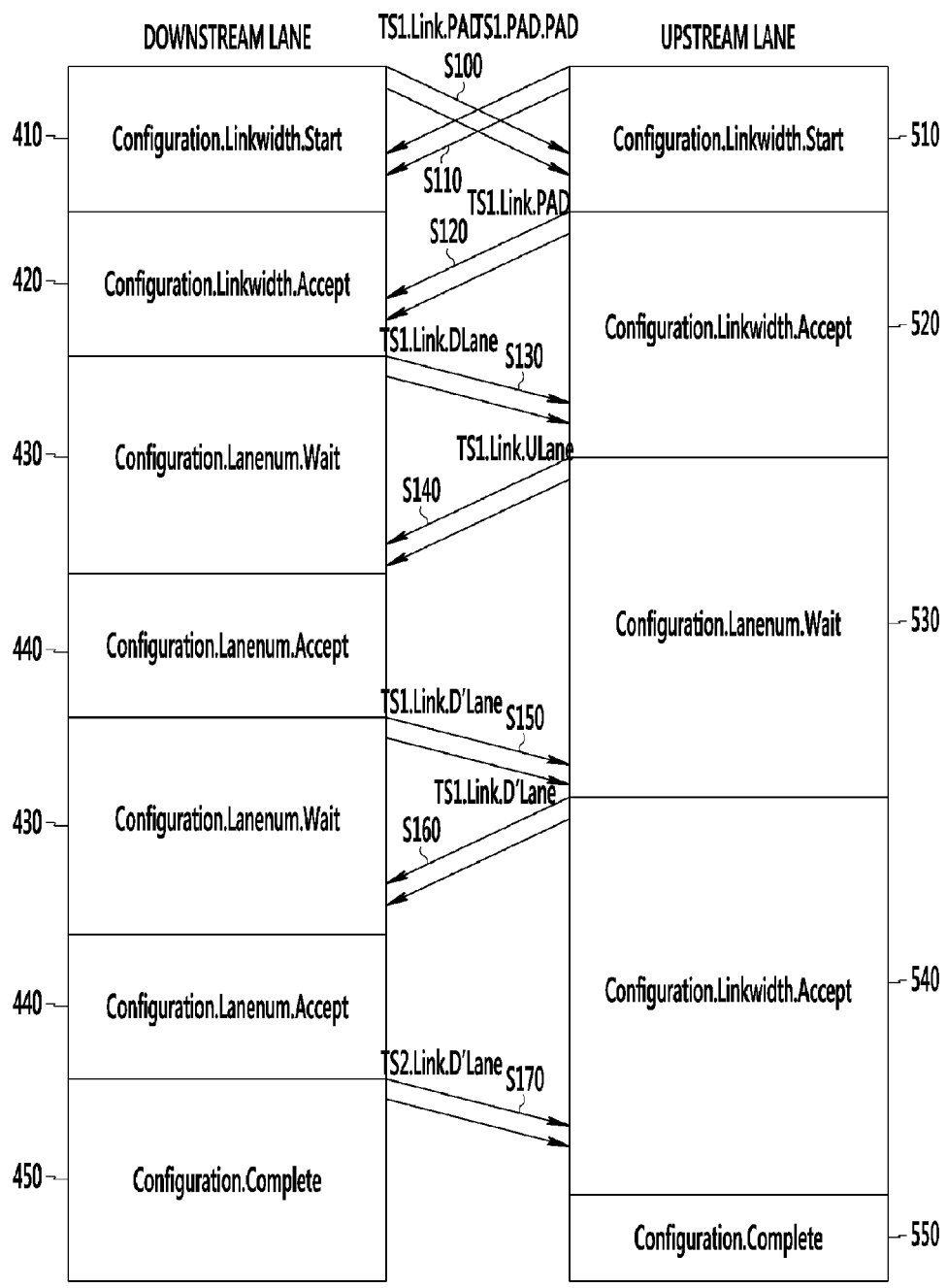
FIG. 9 is a diagram illustrating a negotiation process of determining a link width in a PCI express switch apparatus according to an exemplary embodiment of the present invention.

Hereinafter, a status transition order for determining a link width in a PCI express switch apparatus according to an exemplary embodiment of the present invention will be described with reference to an example that is shown in FIG. 9.

FIG. 9 is a diagram illustrating a negotiation process of determining a link width in a PCI express switch apparatus according to an exemplary embodiment of the present invention.

Referring to FIG. 9, a downstream lane of a Configuration.Linkwidth.Start status 410 transmits TS1 having a predetermined link value and a lane value of a PAD to an entire lane that senses a receiver (S100).

The upstream lane transmits TS1 having a link value and a lane value that are set to a PAD to an entire lane that senses a receiver (S110).

The downstream lane receives two continuous TS1 having a link value of the PAD in lanes, except for a lane 1, and a status of the downstream lane is changed to a Configuration.Linkwidth.Accept status 420.

An upstream lane of a Configuration.Linkwidth.Start status 510 continuously receives two TS1 having a predetermined link number and a lane number of the PAD in an entire lane, except for a lane 7, and a status of the upstream lane is changed to a Configuration.Linkwidth.Accept status 520.

Thereafter, the upstream lane transmits TS1 having the received link value and a lane value of PAD to a lane that receives TS1 and transmits TS1 having a link value and a lane value of the PAD to the lane 7 (S120).

A downstream lane of the Configuration.Linkwidth.Accept status 420 receives TS1 having a lane value of the PAD and a link value in which the downstream lane transmits in an entire lane, except for a lane 1, and a status of the downstream lane is changed to a Configuration.Lanenum.Wait status 430. Thereafter, the downstream lane transmits a TS1 ordered set having a lane value of 0 in a lane 0, a lane value of 1 in a lane 2, a lane value of 2 in a lane 3, a lane value of 3 in a lane 4, a lane value of 4 in a lane 5, a lane value of 5 in a lane 6, a lane value of 6 in a lane 7, a lane value of 7 in a lane 8, and a lane value of 8 in a lane 9, and transmits a TS1 ordered set having a lane value of the PAD to the lane 1 (S130).

An upstream lane of the Configuration.Linkwidth.Accept status 520 receives two continuous TS1 having a predetermined link value and a lane value, not the PAD in any lane, and a status of the upstream lane is changed to a Configuration.Lanenum.Wait status 530.

Thereafter, the upstream lane has the same link value as that of the received TS1, transmits TS1 having a lane value of 0 in a lane 0, a lane value of 1 in a lane 1, a lane value of 2 in a lane 2, a lane value of 3 in a lane 3, a lane value of 4 in a lane 4, a lane value of 5 in a lane 5, a lane value of 6 in a lane 6, a lane value of 7 in a lane 8, and a lane value of 8 in a lane 9, and transmits TS1 having a link value and a lane value of the PAD to a lane 7 (S140).

Because a downstream lane of the Configuration.Lanenum.Wait status 430 receives TS1 having a lane value that does not correspond with a lane value when first entering the Configuration.Lanenum.Wait status 430 in lanes 1, 2, 3, 4, 5, 6, and 7, the downstream lane enters a Configuration.Lanenum.Accept status 440.

Because lanes in which the downstream lane can transmit are 0, 2, 3, 4, 5, 6, 7, 8, and 9, the downstream lane determines that commonly available lanes are a total of 8 lanes of 0, 2, 3, 4, 5, 6, 8, and 9, and enters the Configuration.Lanenum.Wait status 430.

Thereafter, the downstream lane has a predetermined link value and transmits TS1 having a lane value of 0 in a lane 0, a lane value of 1 in a lane 2, a lane value of 2 in a lane 3, a lane value of 3 in a lane 4, a lane value of 4 in a lane 5, a lane value of 5 in a lane 6, a lane value of 6 in a lane 8, and a lane value of 7 in a lane 9 (S150).

Because an upstream lane of the Configuration.Lanenum.Wait status 530 receives TS1 having a lane value that does not correspond with a lane value when first entering the Configuration.Lanenum.Wait status 530 in lanes 1, 2, 3, 4, 5, 6, 8, and 9, lanes in which the upstream lane can transmit are 0, 1, 2, 3, 4, 5, 6, 8, and 9, and thus the upstream lane determines that commonly available lanes are a total of 8 lanes of 0, 2, 3, 4, 5, 6, 8, and 9.

Thereafter, the upstream lane has a link value that is received by entering a Configuration.Lanenum.Accept status 540 and transmits TS1 having a lane value of 0 in a lane 0, a lane value of 1 in a lane 2, a lane value of 2 in a lane 3, a lane value of 3 in a lane 4, a lane value of 4 in a lane 5, a lane value of 5 in a lane 6, a lane value of 6 in a lane 8, and a lane value of 7 in a lane 9.

Because a downstream lane of the Configuration.Lanenum.Wait status 430 receives TS1 having a link value and a lane value that correspond with those TS1 in which the downstream lane transmits, the downstream lane enters a Configuration.Lanenum.Accept status 440 and transmits TS2 having a predetermined link value and lane value by entering a Configuration.Complete status 450.

An upstream lane of a Configuration.Lanenum.Accept status 540 continuously receives two TS2 in 8 lanes and enters a Configuration.Complete status 550.

As described above, in an exemplary embodiment of the present invention, even if a lane is added, a link width can be determined using entire available lanes regardless of order of lanes, and thus even if a problem occurs in a random portion like a cable, maximum bandwidth can be guaranteed using a lane.

Further, even if the n number of cables are additionally installed, because LTSSMS are separated on a lane basis, the cables can be easily added from a design viewpoint, and data can be transmitted and received using the added cable and the N+n−k number (where k is the number of cables in which a failure has occurred) of lanes.

Therefore, when n=N, in a worst case, even if the number of available cables is half, the N number of lanes can be set and thus bandwidth cannot be affected.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A peripheral component interconnect (PCI) express switch apparatus, comprising:
   a first virtual bridge that is connected to a computer system through a first PCI express port to perform data transmission and reception according to a PCI method with an external device;
   a second virtual bridge that is connected to the external device through a second PCI express port and that enables the external device to perform data transmission and reception with the computer system according to the PCI method by cooperating with the first virtual bridge;
   a first cable matching device that is connected to the first virtual bridge; and
   a second cable matching device that is connected to the second virtual bridge and that is connected to the first cable matching device through a PCI cable,
   wherein the PCI cable has a cable corresponding to lanes of a number of more than that of a maximum lane in which the first virtual bridge and the second virtual bridge perform data transmission and reception.

2. The PCI express switch apparatus of claim 1, wherein the first virtual bridge transmits a training sequence (TS) to the second virtual bridge and determines a maximum N number of lanes among an N+n number of cables, when the number of the maximum lane is N (where N is a natural number of 1 or more), and the number of cables which the PCI cable has is N+n (where n is a natural number, which is a maximum N).

3. The PCI express switch apparatus of claim 2, wherein the first virtual bridge and the second virtual bridge are formed in a PCI express hierarchical structure.

4. The PCI express switch apparatus of claim 3, wherein the first virtual bridge comprises:
   a first upstream lane physical layer unit that is connected to the first PCI express port so as to physically transmit a packet to the computer system;
   a first downstream lane physical layer unit that is connected to the first cable matching device so as to physically transmit a packet to the external device;
   a first transaction layer that performs assembling and disassembling of a packet that is transmitted and received through the upstream lane physical layer unit and the downstream lane physical layer unit;
   a first data link layer unit that operates as a data transport component between the transaction layer unit and the upstream lane physical layer unit and that provides a link to a reliable mechanism for exchanging a packet between the transaction layer unit and the upstream lane physical layer unit; and
   a first cable transmitting data link layer unit that operates as a data transport component between the transaction layer unit and the downstream lane physical layer unit and that provides a link to a reliable mechanism for exchanging a packet between the transaction layer unit and the downstream lane physical layer unit.

5. The PCI express switch apparatus of claim 4, wherein the second virtual bridge comprises:
   a second downstream lane physical layer unit that is connected to the second PCI express port so as to physically transmit a packet to the external device;
   a second upstream lane physical layer unit that is connected to the second cable matching device so as to physically transmit a packet to the computer system;
   a second transaction layer that performs assembling and disassembling of a packet that is transmitted and received through the downstream lane physical layer unit and the upstream lane physical layer unit;
   a second data link layer unit that operates as a data transport component between the second transaction layer unit and the second upstream lane physical layer unit and that provides a link to a reliable mechanism for exchanging a packet between the second transaction layer unit and the second upstream lane physical layer unit; and
   a second cable transmitting data link layer unit that operates as a data transport component between the second transaction layer unit and the second downstream lane physical layer unit and that provides a link to a reliable mechanism for exchanging a packet between the second transaction layer unit and the second downstream lane physical layer unit.

6. The PCI express switch apparatus of claim 5, wherein the first virtual bridge and the second virtual bridge each determine a transmittable lane by transmitting a mutual TS through the N+n number of PCI cables.

7. The PCI express switch apparatus of claim 6, wherein the first virtual bridge and the second virtual bridge form the N number of lanes by replacing a lane in which a failure has occurred with available lanes among the additional n number of lanes, when the lane in which a failure has occurred exists among the N number of lanes.

8. The PCI express switch apparatus of claim 6, wherein the first downstream lane physical layer unit and the second upstream lane physical layer unit each have a link training sequence state machine (LTSSM) on a lane basis corresponding to the N+n number of cables, and comprise a bus that is commonly connected to the LTSSM on a lane basis in order for the LTSSM on a lane basis to share a status transition and a status of a TS that is received by the LTSSM on a lane basis.

9. A method in which a PCI express switch apparatus that connects a computer system and an external device by a PCI express method controls a connection to an external device,
   wherein the PCI express switch apparatus connects the external device to the computer system through a PCI cable, and the PCI cable has a cable corresponding to lanes of a number more than that of a maximum lane that transmits and receives data to and from the external device, and
   the PCI express switch apparatus comprises a first virtual bridge that is connected to the computer system and a second virtual bridge that is connected to the external device,
   the method comprising:
   determining, by the first virtual bridge and the second virtual bridge, a lane in which a failure occurs by transmitting a TS to each other;
   determining, when a lane in which a failure occurs is determined, a link width with remaining lanes, except for the lane in which a failure occurs; and
   controlling data transmission according to a PCI express method with the computer system and the external device through the determined link width.

10. The method of claim 9, wherein the determining of a lane in which a failure occurs comprises determining, by the first virtual bridge and the second virtual bridge, a lane in which a failure occurs by transmitting a TS through the N+n number of cables, when the number of the maximum lane is N (where N is a natural number of 1 or more), and the number of cables which the PCI cable has is N+n (where n is a natural number, which is a maximum N).

11. The method of claim 10, wherein the determining of a lane in which a failure occurs comprises:
   transmitting, by a downstream lane that is formed by the first virtual bridge, TS1 having a predetermined link value and a lane value of a PAD to an upstream lane that is formed by the second virtual bridge through the N+n number of lanes;
   transmitting, by the upstream lane, TS1 having a link value and a lane value that are set to a PAD to the downstream lane through the N+n number of lanes;
   transmitting, by the upstream lane, TS1 having a lane value of a PAD and a link value that is received from the downstream lane to a lane that receives TS1, and transmitting TS1 having a lane value and a link value of the PAD to a lane that is determined as a lane in which a failure occurs by not receiving TS1, at the transmitting of TS1; and
   determining, by the downstream lane, a lane in which a failure occurs by not receiving TS1, at the transmitting of TS1.

12. The method of claim 11, wherein the determining of a link width comprises:
   transmitting, by the downstream lane, TS1 having a series of lane values, except for a lane in which a failure occurs among the N+n number of lanes;
   transmitting, by the upstream lane, TS1 having a series of lane values, except for a lane in which a failure occurs among the N+n number of lanes;
   determining, by the downstream lane, an available lane in the downstream lane based on a lane value that is transmitted from the upstream lane; and
   determining, by the upstream lane, an available lane in the upstream lane based on a lane value that is transmitted from the downstream lane.

13. The method of claim 12, wherein the controlling of data transmission comprises:
   transmitting, by the downstream lane, TS1 having a series of lane values to a lane available in the downstream lane;
   transmitting, by the upstream lane, TS1 having a series of lane values to a lane available in the upstream lane;
   transmitting, by the downstream lane, TS2 having a predetermined lane value, when the downstream lane receives TS1 having a lane value corresponding with a value in which the downstream lane transmits from the upstream lane; and
   controlling, by the downstream lane and the upstream lane, data transmission between the computer system and the external device through a lane having a predetermined lane value through TS2.

14. The method of claim 13, wherein the downstream lane and the upstream lane each comprise an LTSSM on a lane basis,
   the LTSSM comprises a Configuration.Linkwidth.Start status, a Configuration.Linkwidth.Accept status, a Configuration.Lanenum.Wait status, a Configuration.Lanenum.Accept status, and a Configuration.Complete status, and
   a status transition occurs by TS1 that is received between the downstream lane and the upstream lane.

15. The method of claim 14, wherein the downstream lane and the upstream lane determine a lane in which a failure occurs through a transition of the Configuration.Linkwidth.Start status and the Configuration.Linkwidth.Accept status.

16. The method of claim 14, wherein the downstream lane and the upstream lane determine a lane corresponding to a link width through a transition of the Configuration.Lanenum.Wait status and the Configuration.Lanenum.Accept status.

17. The method of claim 16, wherein the downstream lane comprises lane information corresponding to the link width in TS2 in the Configuration.Complete status, transmits the TS2 to the upstream lane, and completes a link width negotiation between the downstream lane and the upstream lane.

\* \* \* \* \*